(12) United States Patent
Okada et al.

(10) Patent No.: US 8,382,527 B2
(45) Date of Patent: Feb. 26, 2013

(54) CONNECTOR ENABLING INCREASED DENSITY OF CONTACTS

(75) Inventors: Masafumi Okada, Tokyo (JP); Hiroshi Akimoto, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 12/924,123

(22) Filed: Sep. 21, 2010

(65) Prior Publication Data

US 2011/0092110 A1 Apr. 21, 2011

(30) Foreign Application Priority Data

Oct. 20, 2009 (JP) ................................. 2009-241265

(51) Int. Cl.
*H01R 24/00* (2006.01)
(52) U.S. Cl. ...................................................... 439/660
(58) Field of Classification Search .................. 439/660, 439/330, 636, 637, 59, 79
See application file for complete search history.

(56) References Cited

U.S. PATENT DOCUMENTS

| 5,267,874 | A | * | 12/1993 | Koegel et al. ................. 439/497 |
| 6,129,589 | A | | 10/2000 | Simmel et al. |
| 6,273,753 | B1 | * | 8/2001 | Ko ............................... 439/579 |
| 7,338,318 | B2 | | 3/2008 | Shen et al. |

FOREIGN PATENT DOCUMENTS

| CN | 2462570 | 11/2001 |
| JP | 2000-164284 | 6/2000 |
| JP | 2007-128876 | 5/2007 |
| JP | 2007-141870 | 6/2007 |

OTHER PUBLICATIONS

Chinese Office Action dated Sep. 21, 2012 in Chinese Application No. 201010514874.0 with English translation.

* cited by examiner

*Primary Examiner* — Alexander Gilman
(74) *Attorney, Agent, or Firm* — Collard & Roe, P.C.

(57) ABSTRACT

A plurality of contacts are arranged in a first direction along a side wall of a housing. The housing has a plurality of ribs projecting in a second direction from the side wall and interposed between the contacts, respectively. Each rib has a tapered portion adjacent to the side wall.

12 Claims, 7 Drawing Sheets

CONNECTOR ENABLING INCREASED DENSITY OF CONTACTS

This application is based upon and claims the benefit of priority from Japanese Patent Application No. 2009-241265, filed on Oct. 20, 2009, the disclosure of which is incorporated herein in its entirety by reference.

TECHNICAL FIELD

This invention relates to a connector with contacts held by a housing.

BACKGROUND ART

This type of connector is disclosed in JP-A-2007-128876 (hereinafter referred to as "patent document 1"). The connector disclosed in patent document 1 includes an insulator as a housing and conductive terminals as contacts. The insulator has opposite side walls defining therebetween an insertion groove adapted for receiving therein an FPC as a connection object. The opposite side walls are each formed with a plurality of grooves communicating with the insertion groove. The conductive terminals are attached to the insulator by the use of the grooves formed on one of the opposite side walls.

SUMMARY OF THE INVENTION

In the connector of patent document 1, as a result of forming the grooves on the opposite side walls of the insulator, a plurality of ribs facing the insertion groove are formed between the grooves, respectively. These ribs give restriction to the molding of the insulator as will be described below, thus making it difficult to increase the density of the contacts in the connector.

For example, in the case of molding the insulator by injection molding of a resin material, the temperature of the resin material drops to cause poor fluidity in regions adapted for forming the ribs (hereinafter referred to as "rib forming regions") in a molding die. As a result, there is a possibility of the occurrence of unfilled portions with no resin material in the rib forming regions. In particular, if the ribs are designed to be thin for the purpose of miniaturizing the connector, it becomes difficult to fill the resin material into the rib forming regions so that the probability of the occurrence of the above-mentioned unfilled portions increases. It may happen that the thickness of each rib becomes partially smaller than a set value to cause degradation in insulation between the contacts.

It is therefore an exemplary object of this invention to provide a connector enabling the increased density of contacts as a result of effectively preventing a resin material from being unfilled in molding a housing.

Other objects of the present invention will become clear as the description proceeds.

A connector according to an exemplary aspect of the present invention includes at least one contact and a housing holding the at least one contact, wherein the housing includes a side wall, ribs each of which has a substantially rectangular parallelepiped shape and extends from the side wall, and connecting portions each of which is between the side wall and each of the ribs, wherein a tapered portion is provided on at least one side of each of the connecting portions.

A connector according to another exemplary aspect of the present invention includes a housing having a side wall and contacts arranged in a first direction along the side wall, wherein the housing includes ribs which projects from the side wall in a second direction perpendicular to the first direction and each of which is interposed between the contacts, respectively, and wherein each of the ribs has a tapered portion which is adjacent to the side wall.

EXEMPLARY EMBODIMENTS

Figure 1:
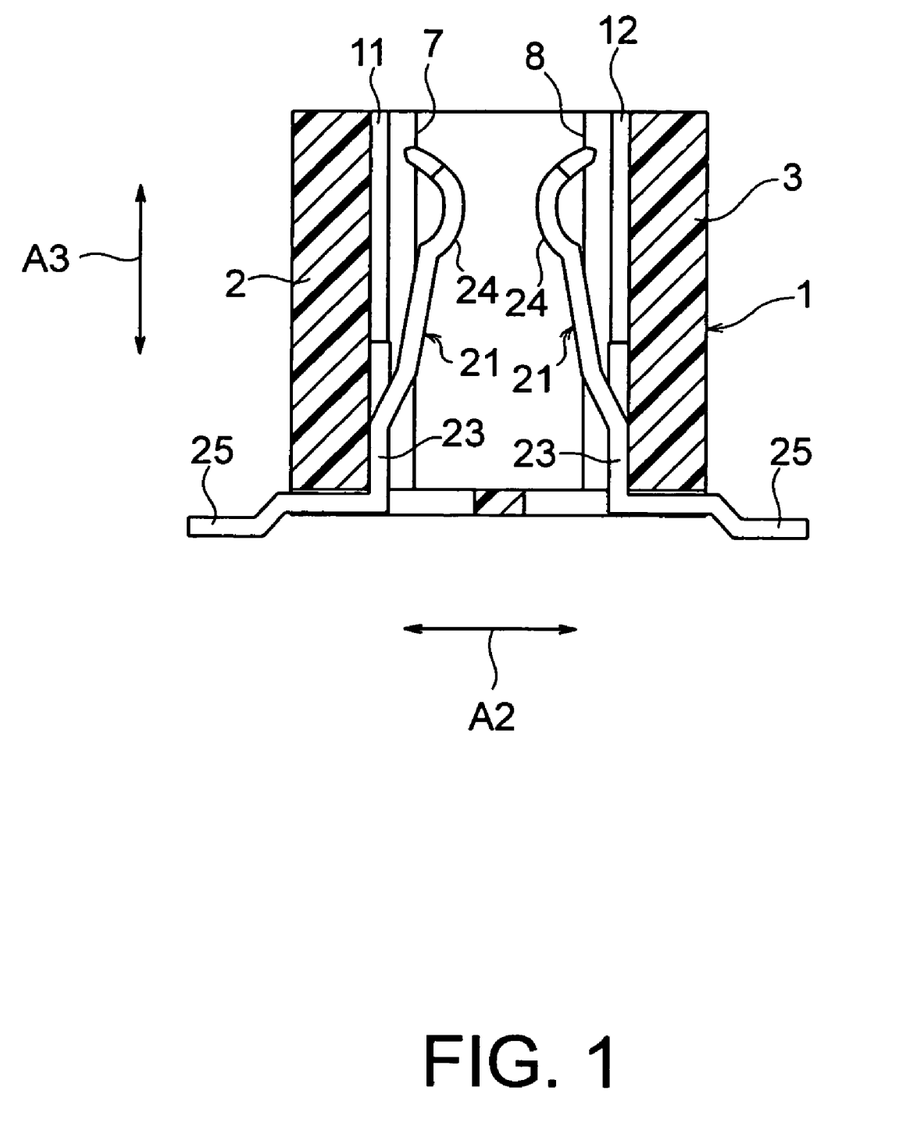
FIG. 1 is a cross-sectional view of a connector according to an exemplary embodiment of this invention.
Figure 2:
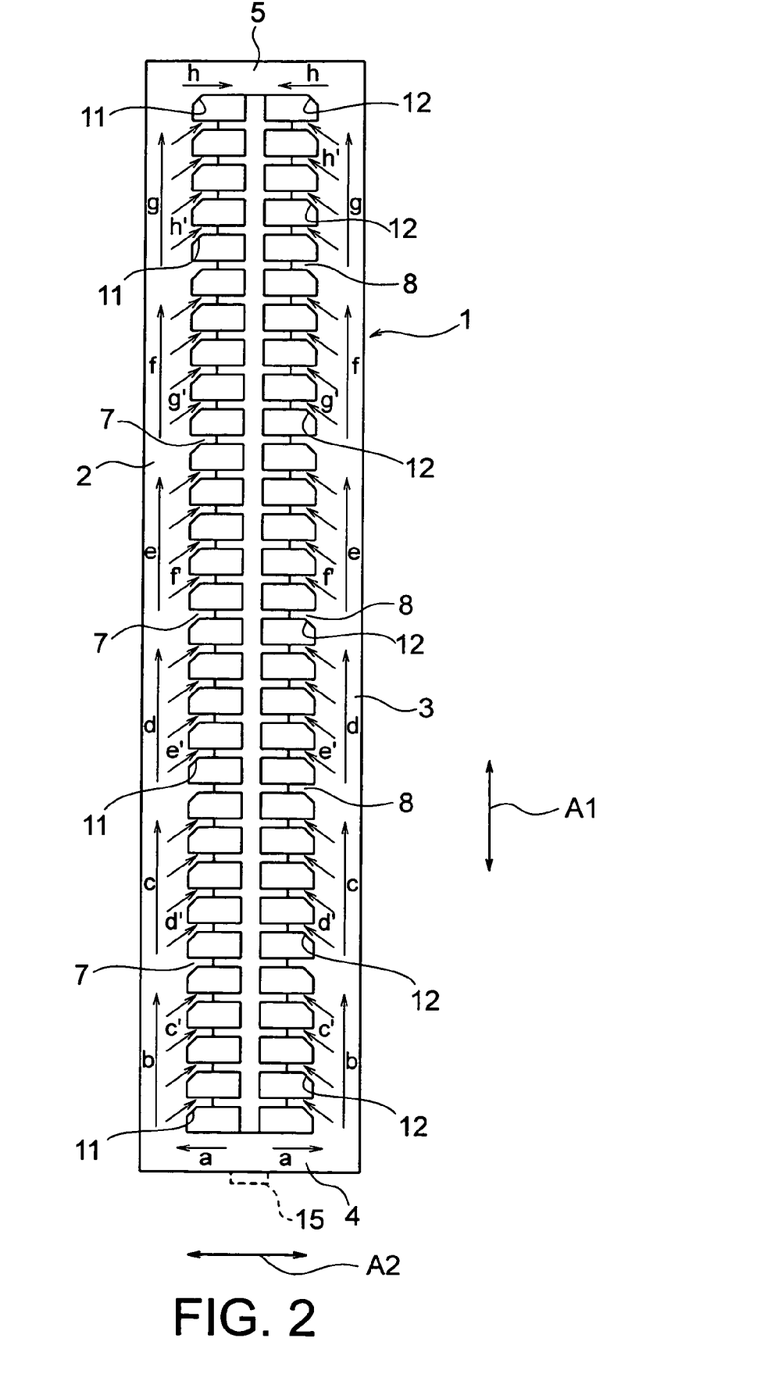
FIG. 2 is a plan view of a housing included in the connector of FIG. 1.

Referring to FIGS. 1 and 2, a connector according to an exemplary embodiment of this invention will be described.

The connector shown in FIG. 1 comprises an insulating housing 1 and a plurality of conductive contacts 21 disposed in the housing 1.

As shown in FIG. 2, the housing 1 has first and second side walls 2 and 3 extending in a first direction A1 and parallel to each other with an interval therebetween, a third side wall 4 connecting ends in the first direction A1 of the first and second side walls 2 and 3 to each other, and a fourth side wall 5 connecting the other ends in the first direction A1 of the first and second side walls 2 and 3 to each other. The first and second side walls 2 and 3 respectively have inner wall surfaces facing each other in a second direction A2 perpendicular to the first direction A1. These inner wall surfaces are each integrally formed with a plurality of ribs 7 or 8 having a substantially rectangular parallelepiped shape and arranged at regular intervals in the first direction A1. Each of the ribs 7 and 8 extends along the inner wall surface of the first or second side wall 2 or 3 in a third direction A3 perpendicular to the first and second directions A1 and A2.

The first and second side walls 2 and 3 are designed to be thicker than the third and fourth side walls 4 and 5. The thickness, i.e. the dimension in the first direction A1, of each of the ribs 7 and 8 is designed to be smaller than that of the third and fourth side walls 4 and 5.

Further, a chamfered portion or a tapered portion (hereinafter referred to as a "tapered portion") 11 is formed at a portion, connected to the first side wall 2, of each rib 7, i.e. at a root portion, adjacent to the first side wall 2, of each rib 7. Specifically, the tapered portion 11 is formed on a surface, facing the third side wall 4 side, i.e. facing the gate side, of the root portion of each rib 7. The tapered portion 11 can also be said to be an inclined surface provided at a connecting portion between the inner wall surface of the first side wall 2 and each rib 7 and inclined to the first and second directions A1 and A2.

It is to be noted that the "gate side" represents the side relatively close to an injection gate 15, which will be described later, while the "gate opposite side", which will be referred to later, represents the side opposite to the gate side, i.e. the side relatively far from the injection gate 15, and that the ribs 7 and 8 are sequentially arranged between the gate side and the gate opposite side.

Likewise, a chamfered portion or a tapered portion (hereinafter referred to as a "tapered portion") 12 is formed at a portion, connected to the second side wall 3, of each rib 8, i.e. at a root portion, adjacent to the second side wall 3, of each rib 8. Specifically, the tapered portion 12 is formed on a surface facing the third side wall 4 side, i.e. facing the gate side, of the root portion of each rib 8. The tapered portion 12 can also be said to be an inclined surface provided at a connecting portion between the inner wall surface of the second side wall 3 and each rib 8 and inclined to the first and second directions A1 and A2.

Referring back to FIG. 1, each contact 21 has a holding portion 23 held by the housing 1, a contact portion 24 extending to one side from the holding portion 23 for contact with a connection object, and a terminal portion 25 extending to the other side from the holding portion 23 so as to be exposed to the outside from a bottom surface of the housing 1. The holding portion 23 of each contact 21 is disposed between the ribs 7 or 8 so as to face the inner wall surface of the first or second side wall 2 or 3. In this manner, the contacts 21 are arranged at a constant pitch in the first direction A1 and, in this connection, the first direction A1 may also be called a "pitch direction".

The contact portions 24 of the contacts 21 are spaced apart from the first and second side walls 2 and 3, respectively. When necessary, a mating connector (not illustrated) is fitted between the first and second side walls 2 and 3. When the mating connector is fitted between the first and second side walls 2 and 3, the contact portions 24 are each pressed against a corresponding one of contacts of the mating connector due to the elasticity of a portion between the holding portion 23 and the contact portion 24.

The terminal portions 25 of the contacts 21 are connected, at their portions respectively extending to the outside of the first and second side walls 2 and 3 from the bottom surface of the housing 1, to circuit conductors of a board such as a printed circuit board (not illustrated) by soldering or the like, respectively.

Now, details of the housing 1 will be described with reference to FIG. 2.

The housing 1 can be molded by injection molding comprising injecting a molten resin material (hereinafter simply referred to as a "resin material") made of a synthetic resin or the like as a nonconductive material into a molding die (not illustrated) and then curing it. The molding die defines therein first to fourth side wall forming regions for use in forming the first to fourth side walls 2 to 5 and rib forming regions for use in forming the ribs 7 and 8. Further, the molding die has an opening for use in injecting the resin material therethrough, i.e. the injection gate (hereinafter simply referred to as a "gate") 15, which is provided at a front end of a metal core (not illustrated).

In FIG. 2, the position of the gate 15 of the molding die is exemplarily shown in relation to the molded housing 1. That is, the gate 15 of the molding die is formed at a position corresponding to the third side wall 4 of the housing 1. For example, the gate 15 is provided at the seam of the molding die.

After injection of the resin material into the molding die through the gate 15, the resin material flows like arrows a to h and c' to h' indicated on the housing 1 so as to be filled in the molding die and then is cured, thereby molding the housing 1.

Now, the process of molding the housing 1 will be described in detail.

When molding the housing 1, the resin material is injected into the molding die through the gate 15. The injected resin material first flows in the arrow a directions in the third side wall forming region in the molding die. Then, the resin material flows in the arrow b to g directions in sequence in each of the first and second side wall forming regions in the molding die. Then, the resin material flows in the arrow h directions in the fourth side wall forming region in the molding die. In this manner, the resin material is filled in the first to fourth side wall forming regions adapted for forming the first to fourth side walls 2 to 5.

The resin material in the regions assigned the arrows b also flows in the arrow c' directions so as to be filled in the rib forming regions. In this event, since the molding die has die surfaces adapted for forming the tapered portions 11 and 12, the resin material smoothly flows from the first and second side wall forming regions into the rib forming regions. Further, while flowing in the regions assigned the arrows c to h, the resin material smoothly flows in the arrow d' to h' directions along the die surfaces of the molding die adapted for forming the tapered portions 11 and 12 so that the resin material is filled in the rib forming regions. In this manner, the resin material is filled in all the rib forming regions adapted for forming the ribs 7 and 8. In this event, since the resin material is smoothly guided into the rib forming regions, it is possible to fill the resin material at a low pressure. Therefore, even if the ribs 7 and 8 are designed to be thin, it is possible to prevent the occurrence of unfilled portions with no resin material and thus it is possible to achieve the increased density of the contacts 21.

It is to be noted that the tapered portions 11 and 12 may be provided only for those ribs 7 and 8 located relatively close to the third side wall 4, i.e. relatively close to the gate side. This structure is effective in the case of a housing having a shape with a shorter dimension in the first direction A1 as compared with the housing 1 shown in FIG. 2.

Figure 3:
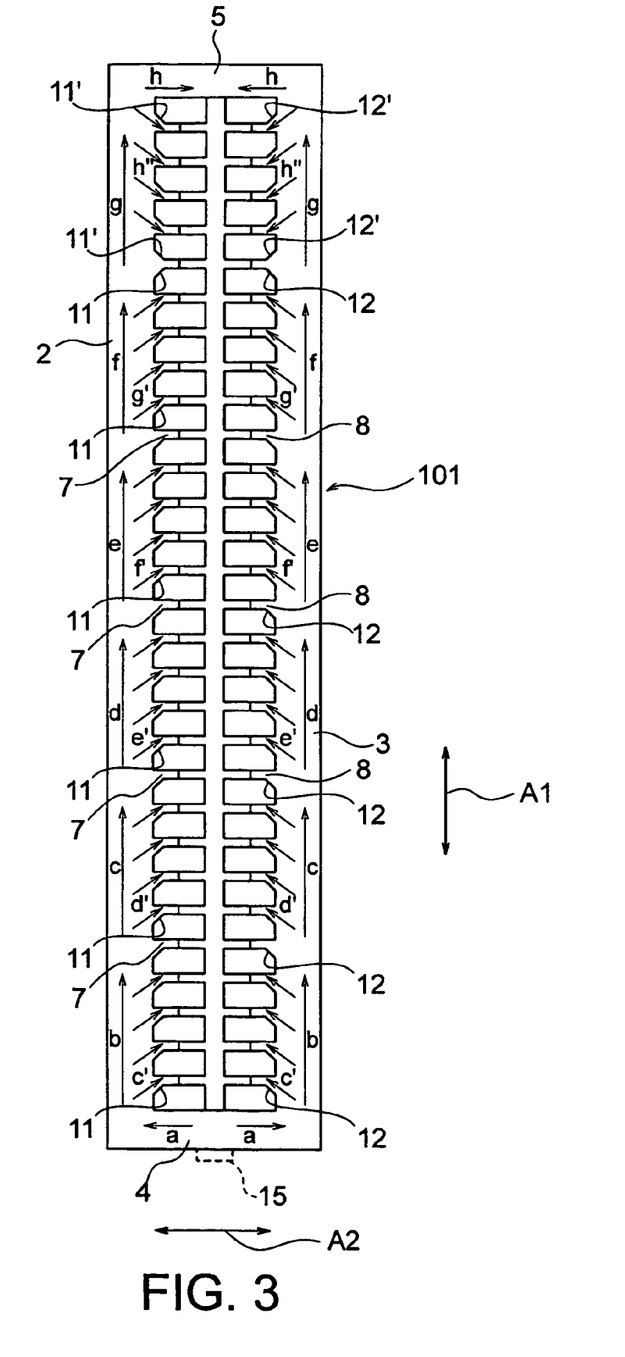
FIG. 3 is a plan view of a first modification of the housing included in the connector of FIG. 1.

FIG. 3 shows a first modification of the housing 1. The same reference symbols are assigned to the same or similar portions, thereby omitting an explanation thereof.

In a housing 101 of FIG. 3, those ribs 7 and 8 located relatively close to a third side wall 4, i.e. the gate side, are each formed with a tapered portion 11 or 12 on the same side as in FIG. 2, i.e. on its surface facing the gate side. On the other hand, those ribs 7 and 8 located relatively far from the gate side, i.e. relatively close to a fourth side wall 5 or the gate opposite side, are each formed with a tapered portion 11' or 12' on the side opposite to that in FIG. 2, i.e. on its surface facing the gate opposite side. That is, the tapered portions 11' and 12' are each formed on the surface, facing the side opposite to the gate side, i.e. facing the gate opposite side, of a root portion of a corresponding one of the ribs 7 and 8.

The above-mentioned structure will be described in more detail. The tapered portion 11 is formed at a connecting portion between a first side wall 2 and each of the ribs 7 located relatively close to the gate side, i.e. at a root portion of each of those ribs 7, on its surface facing the gate side. The tapered portion 12 is formed at a connecting portion between a second side wall 3 and each of the ribs 8 located relatively close to the gate side, i.e. at a root portion of each of those ribs 8, on its surface facing the gate side. The tapered portion 11' is formed at a connecting portion between the first side wall 2 and each of five ribs 7 located relatively close to the gate opposite side opposite to the gate side, i.e. at a root portion of each of those five ribs 7, on its surface facing the gate opposite side. The tapered portion 12' is formed at a connecting portion between the second side wall 3 and each of five ribs 8 located relatively close to the gate opposite side, i.e. at a root portion of each of those five ribs 8, on its surface facing the gate opposite side.

Further, the fifth rib 7 from the fourth side wall 5 is formed with the tapered portions 11' on its surface facing the gate opposite side, in the first direction A1, of its root portion, respectively. Likewise, the fifth rib 8 from the fourth side wall 5 is formed with the tapered portions 12' on its surface facing the gate opposite side, in the first direction A1, of its root portion, respectively.

When molding the housing 101, the resin material is injected into a molding die through a gate 15 and flows in arrow a directions. Then, the resin material flows in arrow b to g directions and then flows in arrow h directions. In this manner, the resin material is filled in first to fourth side wall forming regions adapted for forming the first to fourth side walls 2 to 5.

While flowing in the regions assigned the arrows b, the resin material also flows in arrow c' directions. Further, while flowing like the arrows c to f, the resin material also flows in arrow d' to g' directions. In this manner, the resin material is filled in rib forming regions adapted for forming the ribs 7 and 8. Further, while flowing in the arrow h directions, the resin material also flows in arrow h" directions along die surfaces of the molding die. In this manner, the resin material is filled in rib forming regions adapted for forming the ribs 7 and 8, each in the number of five, located relatively close to the gate opposite side. In this event, since the resin material is smoothly guided into all the rib forming regions, it is possible to fill the resin material at a low pressure. Therefore, even if the ribs 7 and 8 are designed to be thin, it is possible to prevent the occurrence of unfilled portions with no resin material and thus it is possible to achieve the increased density of the contacts 21.

Figure 4:
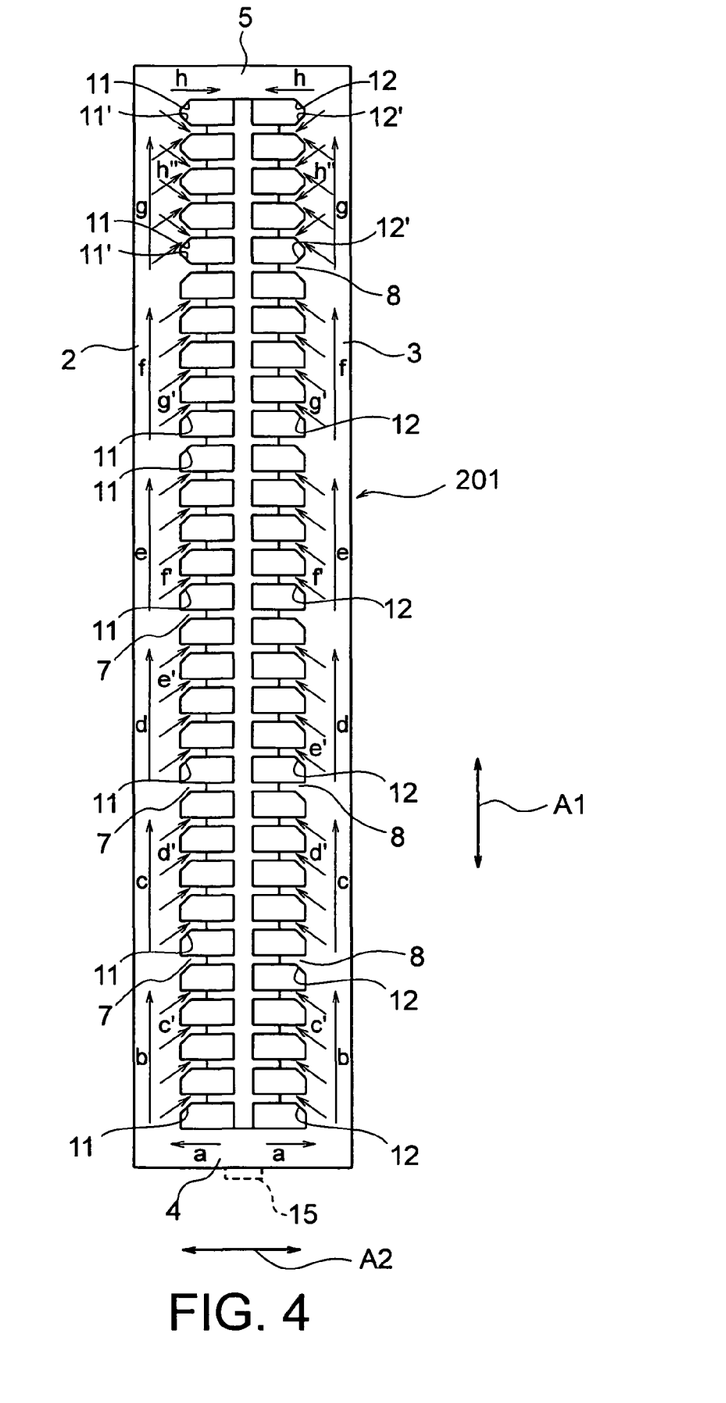
FIG. 4 is a plan view of a second modification of the housing included in the connector of FIG. 1.

FIG. 4 shows a second modification of the housing 1. The same reference symbols are assigned to the same or similar portions, thereby omitting an explanation thereof.

In a housing 201 of FIG. 4, those ribs 7 and 8 located relatively close to a third side wall 4, i.e. the gate side, are each formed with a tapered portion 11 or 12 on the same side as in FIG. 2, i.e. on its surface facing the gate side. On the other hand, those ribs 7 and 8 located relatively far from the gate side, i.e. relatively close to a fourth side wall 5 or the gate opposite side, are each formed with tapered portions 11 and 11' or tapered portions 12 and 12' on its both surfaces facing the gate side and facing the gate opposite side, respectively. That is, five ribs 7 and five ribs 8 located relatively close to the gate opposite side are each formed with the tapered portions 11 and 11' or 12 and 12' on its both sides in the first direction A1.

When molding the housing 201, the resin material is injected into a molding die through a gate 15 and flows in arrow a directions. Then, the resin material flows in arrow b to g directions and then flows in arrow h directions. In this manner, the resin material is filled in first to fourth side wall forming regions adapted for forming the first to fourth side walls 2 to 5.

While flowing in the regions assigned the arrows b, the resin material also flows in arrow c' directions. Further, while flowing like the arrows c to f, the resin material also flows in arrow d' to g' directions. In this manner, the resin material is filled in rib forming regions adapted for forming the ribs 7 and 8. Further, while flowing in the arrow g and h directions, the resin material also flows in arrow h' and h" directions along die surfaces of the molding die. In this manner, the resin material is filled in rib forming regions adapted for forming the ribs 7 and 8, each in the number of five, located relatively close to the gate opposite side. In this event, since the resin material is smoothly guided into all the rib forming regions, it is possible to fill the resin material at a low pressure. Therefore, even if the ribs 7 and 8 are designed to be thin, it is possible to prevent the occurrence of unfilled portions with no resin material and thus it is possible to achieve the increased density of the contacts 21.

Figure 5:
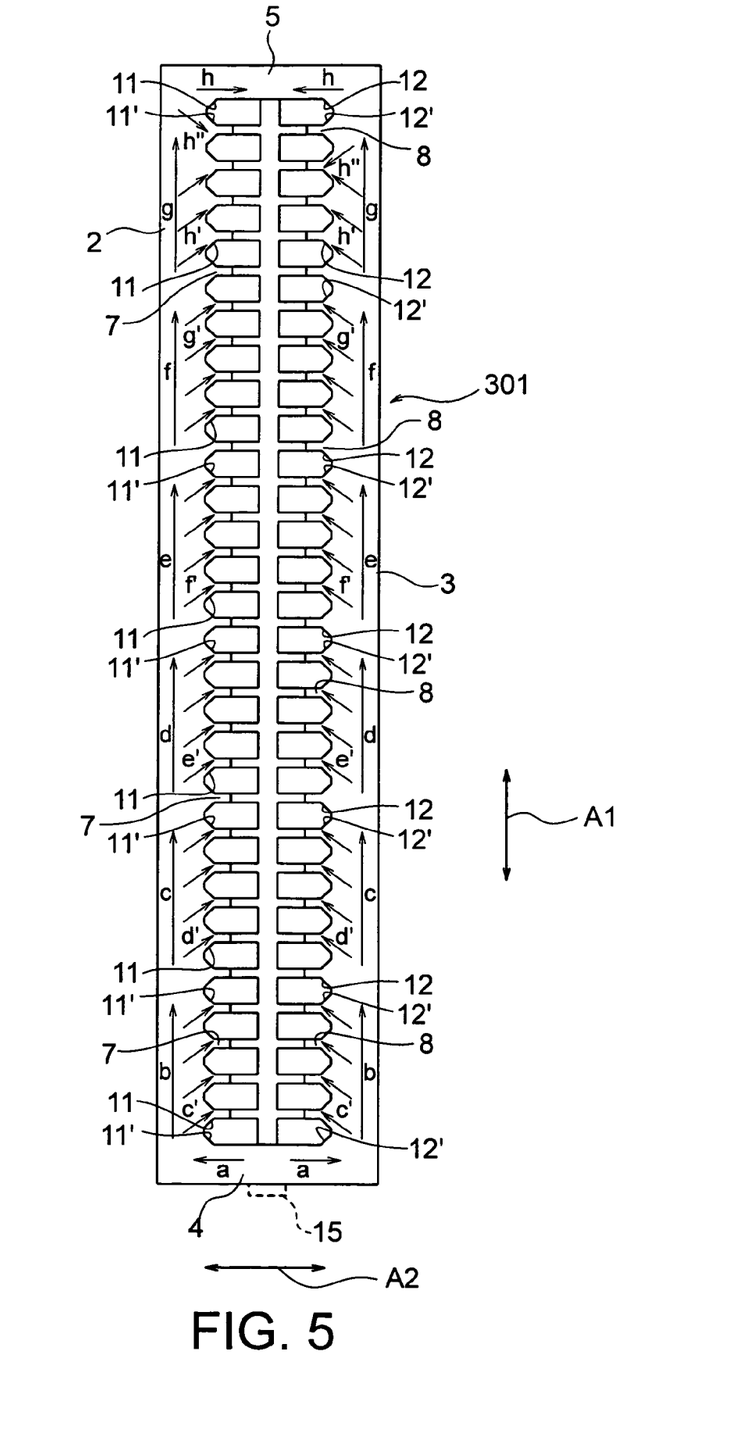
FIG. 5 is a plan view of a third modification of the housing included in the connector of FIG. 1.

FIG. 5 shows a third modification of the housing 1. The same reference symbols are assigned to the same or similar portions, thereby omitting an explanation thereof.

In a housing 301 of FIG. 5, all ribs 7 and 8 are each formed with tapered portions 11 and 11' or tapered portions 12 and 12' on its both surfaces facing the gate side and facing the gate opposite side, respectively. That is, the tapered portions 11 and 11' are formed on both surfaces, facing the gate side and facing the gate opposite side, of a connecting portion between a first side wall 2 and each of the ribs 7 while the tapered portions 12 and 12' are formed on both surfaces, facing the gate side and facing the gate opposite side, of a connecting portion between a second side wall 3 and each of the ribs 8.

When molding the housing 301, the resin material is injected into a molding die through a gate 15 and flows in arrow a directions. Then, the resin material flows in arrow b to g directions and then flows in arrow h directions. In this manner, the resin material is filled in first to fourth side wall forming regions adapted for forming the first to fourth side walls 2 to 5.

While flowing in the regions assigned the arrows b, the resin material also flows in arrow c' directions. In this event, the resin material flows along die surfaces, adapted for forming the ribs 7 and 8, of the molding die. Further, while flowing like the arrows c to f, the resin material also flows in arrow d' to g' directions along die surfaces of the molding die. In this manner, the resin material is filled in rib forming regions adapted for forming the ribs 7 and 8. Further, while flowing in the arrow g and h directions, the resin material also flows in arrow h' and h" directions along die surfaces of the molding die. In this manner, the resin material is filled in rib forming regions adapted for forming the ribs 7 and 8 located relatively close to the gate opposite side. In this event, since the resin material is smoothly guided into all the rib forming regions, it is possible to fill the resin material at a low pressure. Therefore, even if the ribs 7 and 8 are designed to be thin, it is possible to prevent the occurrence of unfilled portions with no resin material and thus it is possible to achieve the increased density of the contacts 21.

The above-mentioned connector can be used as each of a plug connector and a receptacle connector adapted to be mated with each other, a connector for connection to a flat-type flexible cable such as an FPC or FFC, or a connector for connecting printed circuit boards to each other.

The housing can be variously modified. When it is necessary to arrange the contacts 21 at a narrow pitch, the shape of tapered portions is properly designed according to the thickness of the ribs 7 and 8, the magnitude of the pitch, and the shape of the contacts 21. For example, an inclined surface defining each tapered portion may be formed as a curved surface.

Each contact 21 is not limited to that shown in FIG. 2 and may be a contact with a well-known shape that is used in this type of connector. As one example, the terminal portion 25 of each contact 21 may be of the type that is press-fitted into a through hole of a printed circuit board so as to be connected to a circuit conductor.

As a connection object of the connector, it may be a mating connector, a flexible circuit board, or an FPC.

The whole or part of the exemplary embodiments disclosed above can be described as, but not limited to, the following supplementary notes.

(Supplementary Note 1) A connector comprising:
at least one contact, and
a housing holding the at least one contact,
wherein the housing comprises:
a side wall;
ribs each of which has a substantially rectangular parallelepiped shape and extends from the side wall; and
connecting portions each of which is between the side wall and each of the ribs,
wherein a tapered portion is provided on at least one side of each of the connecting portions.

(Supplementary Note 2) The connector according to supplementary note 1, wherein each of the connecting portions includes a first side facing an injection gate adapted for injecting a resin material therethrough when molding the housing, and wherein the tapered portion is provided on the first side.

(Supplementary Note 3) The connector according to supplementary note 1, wherein each of the connecting portions includes a first side facing an injection gate adapted for injecting a resin material therethrough when molding the housing, and a second side opposite to the first side, and wherein the connecting portions comprise:
a first type in which the tapered portion is provided on the first side; and
a second type in which the tapered portion is provided on the second side.

(Supplementary Note 4) The connector according to supplementary note 1, wherein each of the connecting portions includes the first side facing an injection gate adapted for injecting a resin material therethrough when molding the housing, and a second side opposite to the first side, and wherein the tapered portions are provided on both of the first and the second sides, respectively.

(Supplementary Note 5) A connector comprising:
a housing having a side wall; and
contacts arranged in a first direction along the side wall,
wherein the housing comprises ribs which projects from the side wall in a second direction perpendicular to the first direction and each of which is interposed between the contacts, respectively, and
wherein each of the ribs has a tapered portion adjacent to the side wall.

(Supplementary Note 6) The connector according to supplementary note 5, wherein:
the housing is molded using a molding die having an injection gate adapted for injecting a resin material therethrough and has a gate side formed relatively close to the injection gate and a gate opposite side formed relatively far from the injection gate,
the ribs are sequentially arranged between the gate side and the gate opposite side, and
each of the tapered portions has an inclined surface inclined to the first and second directions.

(Supplementary Note 7) The connector according to supplementary note 6, wherein each of the ribs has the tapered portion on its surface facing the gate side.

(Supplementary Note 8) The connector according to supplementary note 6, wherein the ribs include those ribs each having the tapered portion only on its surface facing the gate side.

(Supplementary Note 9) The connector according to supplementary note 8, wherein the ribs further include those ribs each having the tapered portion only on its surface facing the gate opposite side.

(Supplementary Note 10) The connector according to supplementary note 8, wherein the ribs further include those ribs each having the tapered portion on each of its surfaces facing the gate side and facing the gate opposite side, respectively.

(Supplementary Note 11) The connector according to supplementary note 6, wherein each of the ribs has the tapered portion on each of its surfaces facing the gate side and facing the gate opposite side, respectively.

(Supplementary Note 12) The connector according to supplementary note 5, wherein each of the ribs extends along the side wall in a third direction perpendicular to the first and second directions.

(Supplementary Note 13) The connector according to supplementary note 12, wherein each of the ribs has a substantially rectangular parallelepiped portion extending in the third direction and the tapered portion is formed at a part, in the third direction, of the substantially rectangular parallelepiped portion.

While this invention has been described with reference to the embodiment and modifications, this invention is not limited thereto. Various changes that can be understood by a person skilled in the art can be made to the structures and details of this invention within the scope of this invention.

Figure 6:
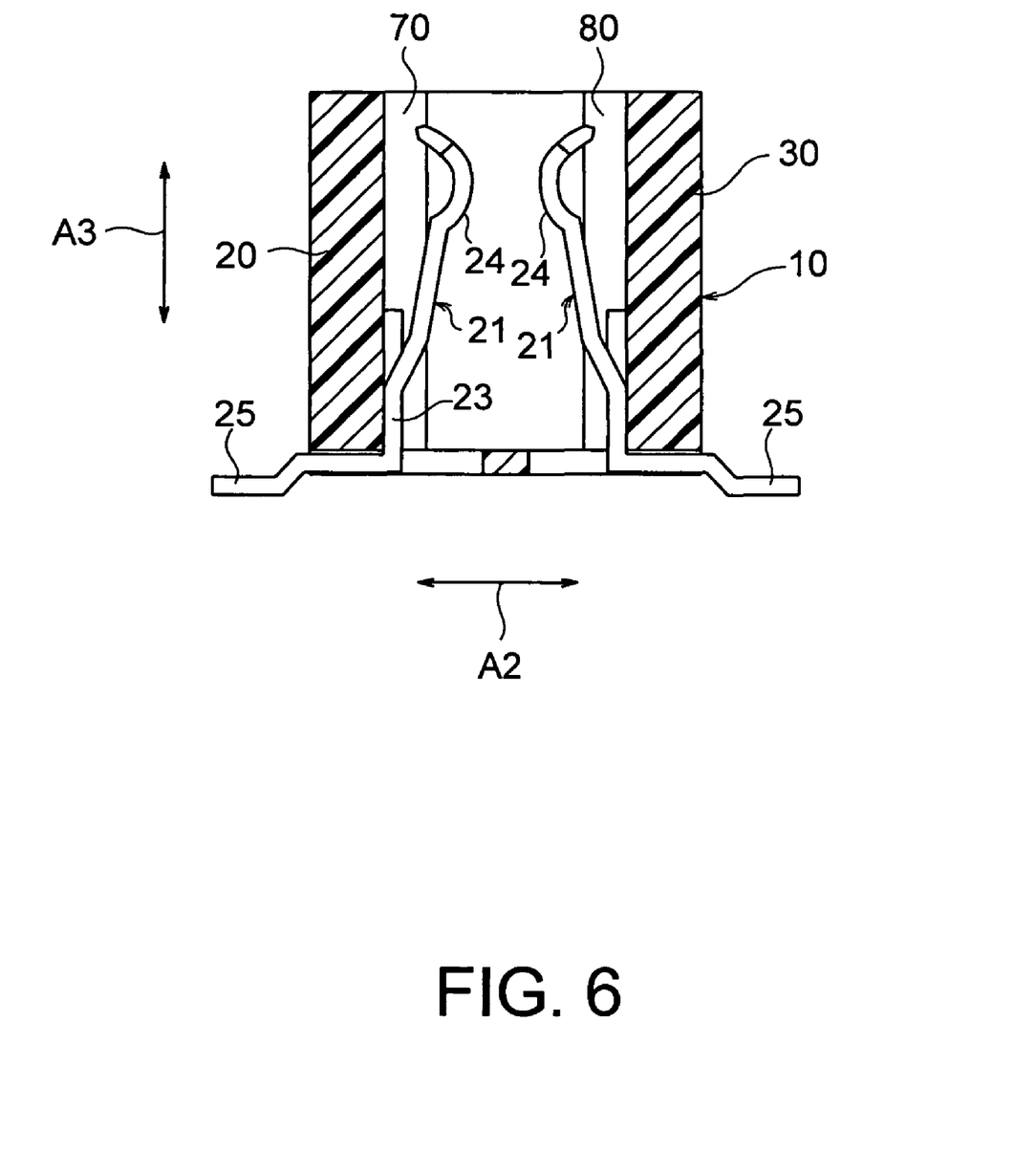
FIG. 6 is a cross-sectional view of a connector according to related art 1.
Figure 7:
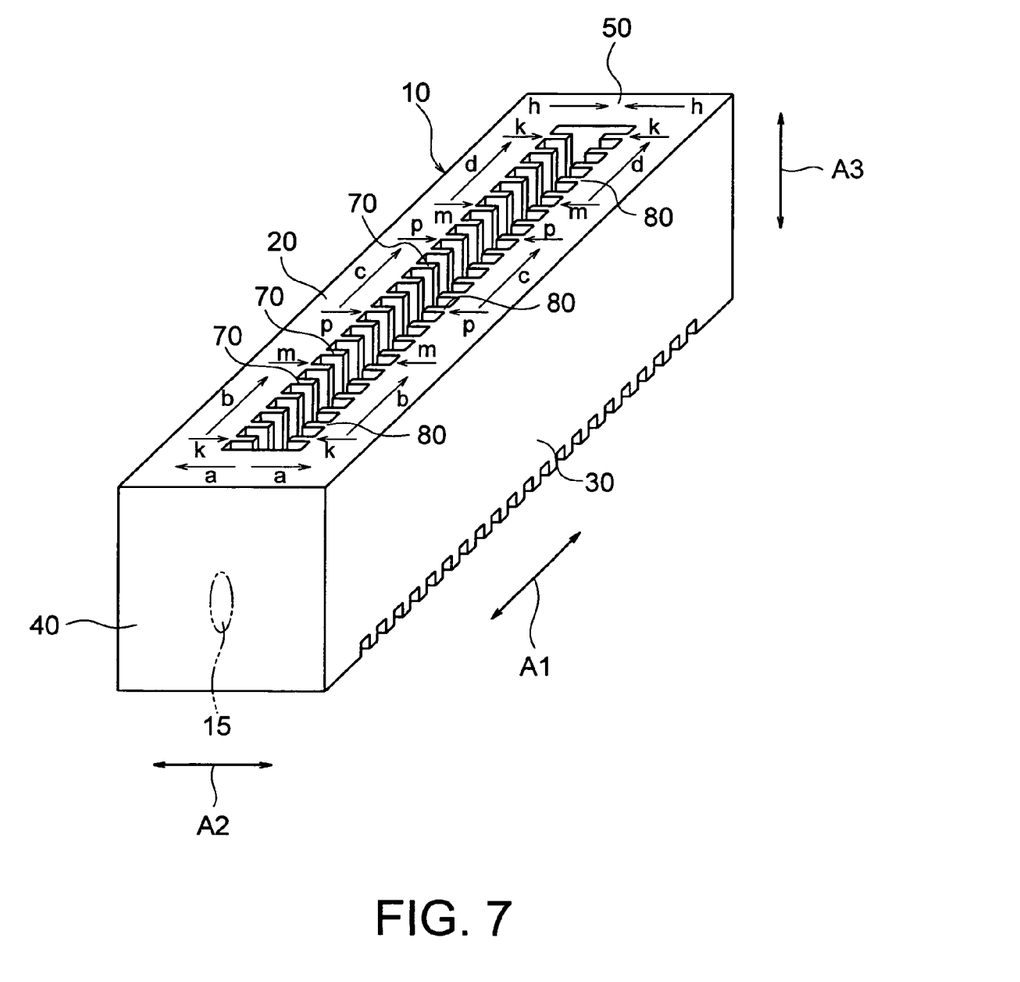
FIG. 7 is a perspective view of a housing included in the connector of FIG. 6.

Referring now to FIGS. 6 and 7, a connector as related art 1 will be described.

The connector shown in FIG. 6 comprises an insulating housing 10 and a plurality of conductive contacts 21 disposed in the housing 10.

As shown in FIG. 7, the housing 10 has first and second side walls 20 and 30 extending in a first direction A1 and parallel to each other with an interval therebetween, a third side wall 40 connecting ends in the first direction A1 of the first and second side walls 20 and 30 to each other, and a fourth side wall 50 connecting the other ends in the first direction A1 of the first and second side walls 20 and 30 to each other. The first and second side walls 20 and 30 respectively have inner wall surfaces facing each other in a second direction A2 perpendicular to the first direction A1. These inner wall surfaces are each integrally formed with a plurality of ribs 70 or 80 having a substantially rectangular parallelepiped shape and arranged at regular intervals in the first direction A1. Each of the ribs 70 and 80 extends along the inner wall surface of the first or second side wall 20 or 30 in a third direction A3 perpendicular to the first and second directions A1 and A2.

Referring back to FIG. 6, each contact 21 has a holding portion 23 held by the housing 10, a contact portion 24 extending to one side from the holding portion 23 for contact with a connection object, and a terminal portion 25 extending to the other side from the holding portion 23 so as to be exposed to the outside from a bottom surface of the housing 10. The holding portion 23 of each contact 21 is disposed between the ribs 70 or 80 so as to face the inner wall surface of the first or second side wall 20 or 30.

The housing 10 can be molded by injection molding comprising injecting a molten resin material (hereinafter simply referred to as a "resin material") into a molding die (not illustrated) and then curing it. The molding die has an opening for use in injecting the resin material therethrough, i.e. a gate 15.

In FIG. 7, the position of the gate 15 of the molding die is exemplarily shown in relation to the molded housing 10. That is, the gate 15 of the molding die is formed at a position corresponding to the third side wall 40 of the housing 10. After injection of the resin material into the molding die through the gate 15, the resin material flows like arrows a to d, h, k, m, and p indicated on the housing 10 so as to be filled in the molding die and then is cured, thereby molding the housing 10.

Now, the process of molding the housing 10 will be described in detail with reference to FIG. 7.

The resin material injected into the molding die through the gate 15 first flows in the arrow a directions in the molding die. Then, the resin material flows in the arrow b to d directions in sequence in the molding die. Then, the resin material flows in the arrow h directions in the molding die. In this manner, the resin material is filled in regions adapted for forming the first to fourth side walls 20 to 50.

Thereafter, the resin material filled in the regions adapted for forming the first and second side walls 20 and 30 flows in the arrow k directions in the molding die so as to be filled in regions adapted for forming those ribs 70 and 80 near the gate 15. Further, the resin material filled in the regions adapted for forming the first and second side walls 20 and 30 flows in the arrow m and p directions in the molding die so as to be filled in regions in sequence adapted for forming the other ribs 70 and 80. In this manner, the resin material is also filled in the regions adapted for forming all the ribs 70 and 80. The resin material is cured after being filled in the molding die so that the housing 10 is molded.

In the case of the connector of related art 1, since, in the molding die, the resin material filled in the regions adapted for forming the first and second side walls flows into the regions adapted for forming the ribs, the lowering of the temperature of the resin material cannot be avoided in the regions adapted for forming the ribs. This means that the resin material with increased viscosity and thus decreased fluidity is filled into the regions adapted for forming the ribs. Accordingly, there is a possibility of the occurrence of unfilled portions with no resin material in those regions.

In particular, if the first to fourth side walls or the ribs of the housing are designed to be thin for the purpose of miniaturizing the connector, it becomes difficult to fill the resin material into the corresponding regions of the molding die so that the probability of the occurrence of the above-mentioned unfilled portions increases.

On the other hand, if the resin material is filled at a high pressure when molding the housing, there is concern about the occurrence of a problem such as breakage of a metal core provided adjacent to the gate side in the molding die.

In the connector of related art 1, the thickness of each rib may become partially smaller than a set value when the housing is molded of the resin material. In this case, there arises a problem of degradation in insulation between the contacts.

What is claimed is:

1. A connector comprising:
   at least one contact; and
   a housing holding the at least one contact, the housing comprising:
      a bottom surface;
      a side wall;
      ribs, each rib of said ribs having a substantially rectangular parallelepiped shape and extending from the side wall; and
      three-dimensional connecting portions, each three-dimensional connecting portion of said three-dimensional connecting portions:
         connecting the side wall and a respective rib of the ribs;
         comprising at least one side and a tapered portion on the at least one side;
         extending at a 90° angle from the bottom surface at the tapered portion;
         having a first width at a beginning of the tapered portion at a region adjacent the side wall; and
         having a second width at an ending of the tapered portion at a region adjacent the respective rib, the first width being greater than the second width.

2. The connector according to claim 1, wherein the at least one side of each of the three-dimensional connecting portions includes:
   a first side; and
   a second side opposite to the first side; and
   wherein the connecting portions comprise:
      a first type in which the tapered portion is provided on the first side; and
      a second type in which the tapered portion is provided on the second side.

3. The connector according to claim 1, wherein the at least one side of each of the three-dimensional connecting portions includes:
   a first side; and
   a second side opposite to the first side; and
   wherein each tapered portion comprises a respective first tapered portion on the first side and a respective second tapered portion on the second side.

4. A connector comprising:
   a housing having a side wall and a bottom surface; and
   contacts arranged in a first direction along the side wall;
   wherein the housing comprises ribs which project from the side wall in a second direction perpendicular to the first direction and each of which is interposed between the contacts, respectively;
   wherein each of the ribs has a respective three-dimensional connecting portion adjacent to the side wall; and
   wherein each respective three-dimensional connecting portion has at least one side and a tapered portion on the at least one side, extends at a 90° angle from the bottom surface at the tapered portion, has a first width at a beginning of the tapered portion at a region adjacent the side wall, and has a second width at an ending of the tapered portion at a region adjacent the respective rib, the first width being greater than the second width.

5. The connector according to claim 4, wherein:
   the housing has a first side and a second side formed opposite to the first side,
   the ribs are sequentially arranged between the first side and the second side, and
   each of the tapered portions has an inclined surface inclined to the first and second directions.

6. The connector according to claim 5, wherein each of the ribs has the tapered portion on its surface facing the first side.

7. The connector according to claim 5, wherein the ribs include those ribs each having the tapered portion only on its surface facing the first side.

8. The connector according to claim 7, wherein the ribs further include those ribs each having the tapered portion only on its surface facing the second side.

9. The connector according to claim 7, wherein the ribs further include those ribs each having the tapered portion on each of its surfaces facing the first side and facing the second side, respectively.

10. The connector according to claim 5, wherein each of the ribs has the tapered portion on each of its surfaces facing the first side and facing the second side, respectively.

11. The connector according to claim 4, wherein each of the ribs extends along the side wall in a third direction perpendicular to the first and second directions.

12. The connector according to claim 11, wherein each of the ribs has a substantially rectangular parallelepiped portion extending in the third direction and the tapered portion is formed at a part, in the third direction, of the substantially rectangular parallelepiped portion.

* * * * *